No. 895,727. PATENTED AUG. 11, 1908.
S. F. CLOUSER.
DRIVE CHAIN.
APPLICATION FILED SEPT. 11, 1907.
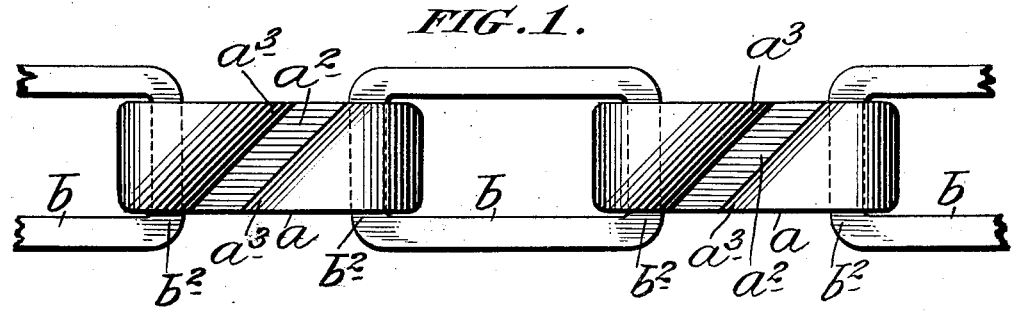
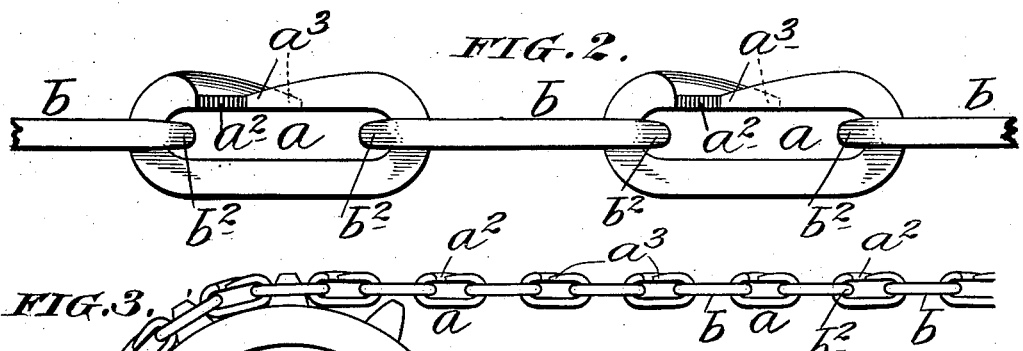
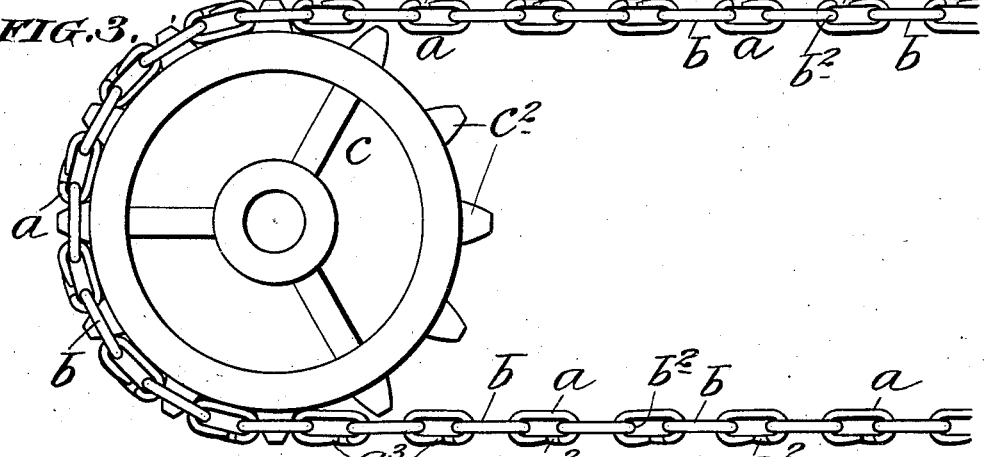
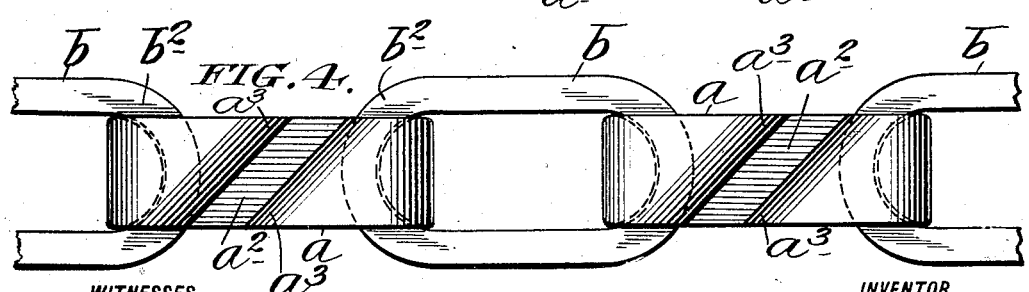
WITNESSES
M. E. Doody
C. E. Mulheany
INVENTOR,
Samuel F. Clouser,
BY
Edgar Tate & Co
ATTORNEYS

UNITED STATES PATENT OFFICE.

SAMUEL F. CLOUSER, OF BROOKLYN, NEW YORK, ASSIGNOR TO NEW YORK LINK BELT CHAIN COMPANY, A CORPORATION OF NEW YORK.

DRIVE-CHAIN.

No. 895,727.   Specification of Letters Patent.   Patented Aug. 11, 1908.

Application filed September 11, 1907. Serial No. 392,350.

*To all whom it may concern:*

Be it known that I, SAMUEL F. CLOUSER, a citizen of the United States, and residing at Brooklyn, in the county of Kings and State of New York, have invented certain new and useful Improvements in Drive - Chains, of which the following is a specification, such as will enable those skilled in the art to which it appertains to make and use the same.

This invention relates to drive chains or power chains of the endless belt type; and the object thereof is to provide an improved chain of this class composed of coupling and coupled links, the coupling links being so formed that the coupled links may be conveniently detached therefrom and other links substituted or the chain shortened or lengthened whenever desired.

The invention is fully described in the following specification of which the accompanying drawing forms a part, in which the separate parts of my improvement are designated by suitable reference characters in each of the views and in which;—

Figure 1 is a plan view of a short section of a drive or power chain made according to my invention. Fig. 2 a side view thereof. Fig. 3 a view similar to Fig. 2 but showing a part of the chain mounted on a sprocket wheel and:—Fig. 4 a view similar to Fig. 1 but showing a slight modification.

In the practice of my invention I provide a chain of the class specified composed of two different forms of links, one form of the links, for the purpose of this description, being called coupling links, and the other form of links being called coupled links.

Referring to the drawing, I have shown in Figs. 1 and 2 a part of a chain of the class specified composed of coupling links $a$ and coupled links $b$. The coupled links $b$ in Figs. 1 and 2 are oblong and substantially rectangular in form and the side portions of the coupling links are flat and the top or outer side portions thereof are provided with diagonally arranged slots or openings $a^2$ forming projecting points $a^3$ at the opposite side of said links which overlap each other as clearly shown in Fig. 1. The ends $b^2$ of the coupled links $b$, are of such dimensions as to permit of their being passed through the slots or openings $a^2$ in the coupling links $a$ when the said coupled links $b$ are held at an angle to the coupling links with the ends thereof in a position which corresponds with the position of the said slots or openings, and the transverse dimensions of the end portion of the coupled links are preferably such that the said end portions of the said links can only be passed through the slots $a^2$ when the coupled links are moved endwise into said slots and are held diagonally and transversely of the coupling links. In other words the end portions $b^2$, of the coupled links cannot be passed through the slots $a^2$ when the said coupled links are held horizontally or parallel with the coupling links.

In Fig. 3 I have shown at $c$ an ordinary power or drive wheel, on which a part of a drive chain made as shown in Figs. 1 and 2 is mounted, and the drive wheel $c$ is provided with sprockets $c^2$ which pass through the coupled links $b$. With a chain made in this manner it is impossible for the coupled and coupling links to become disconnected in the operation of the chain, no matter how loose the chain may be, as it is impossible to disconnect any one of the coupled links from any one of the coupling links without raising the coupled link and holding it at an angle to the coupling link with the end of the coupled link in line with the slot in the coupling link and in the operation of raising the coupled link it must also be turned laterally so that the end thereof will be parallel with the slot in the coupling link.

It will also be apparent that by holding one of the coupled links $b$ horizontally and turning it slightly to the left in the construction shown in Fig. 4 the right hand side of said link may be dropped in through the transverse slot or opening $a^2$ in the coupling link at the front of the said coupled link, the left hand side of the coupled link in this operation being slightly raised, and in this way the separate parts of a chain may be connected even though there be but slight slack in the chain.

In the construction shown in Figs. 1 to 3 inclusive half the links are coupling links and the other half are coupled links, but it will be understood that this form of construction is not absolutely necessary for the reason that for the purpose of taking up slack, or for shortening or lengthening the chain it is not necessary for half the links of the chain to be coupling links.

In Fig. 4, I have shown a modification of the form of chain shown in Figs. 1 and 2, but the only difference is in the form of the ends of the separate links, which in Fig. 4, are circular or segmental in form, whereas in the construction shown in Figs. 1 and 2, the end portions of the separate links are approximately straight and at right angles to the side portions thereof.

I am aware that drive chains of this class have heretofore been made in which coupling links were employed having transverse slots or openings in the outer side thereof through which the ends of coupled links could be passed, but these slots were arranged at right angles to the link and not diagonally thereof, and with this construction there is or was danger of the separate links becoming detached or disconnected in the operation of the chain, but with my improvement this result is impossible; and with my improvement the ends of the coupled links may be made small enough to pass freely through the slots or openings $a^2$ in the coupling links or the end portions of the coupled links may be made of less transverse dimensions than the slots or openings in the coupling links without any possibility of said links becoming detached in the operation of the chain.

In my invention, as will be observed, the opposite side portions of the coupling links are of considerable transverse width, and by reason of this fact the slots or openings $a^2$ are of considerable length and the oppositely arranged points $a^3$ overlap each other to an extent as great or greater than the transverse dimensions of the end portions of the coupled links and this feature of the construction also, as will be understood, materially aids in accomplishing the desired result.

Having fully described my invention, what I claim as new and desire to secure by Letters Patent is:—

A drive chain composed of coupling and coupled links, the sides of the coupling links being oblong in form in cross section and one side thereof being provided with a straight diagonally arranged slot or opening through which the end or side portions of the coupled links may be passed, said slot or opening forming oppositely arranged points on the opposite end portions of the link, which overlap each other.

In testimony that I claim the foregoing as my invention I have signed my name in presence of the subscribing witnesses this 6th day of September 1907.

SAMUEL F. CLOUSER.

Witnesses:
 M. E. DOODY,
 C. E. MULREANY.